United States Patent
Lee et al.

(10) Patent No.: US 11,216,622 B2
(45) Date of Patent: Jan. 4, 2022

(54) TEST APPARATUS, TEST SYSTEM INCLUDING TEST APPARATUS, TEST METHOD USING TEST APPARATUS AND TEST SYSTEM, AND METHOD OF MANUFACTURING INTEGRATED CIRCUIT

(71) Applicant: Samsung Electronics Co., Ltd., Suwon-si (KR)

(72) Inventors: Jae Seol Lee, Suwon-si (KR); Ki Ock Hong, Seoul (KR); Hae Seong Jeong, Seongnam-si (KR)

(73) Assignee: SAMSUNG ELECTRONICS CO., LTD., Gyeonggi-do (KR)

( * ) Notice: Subject to any disclaimer, the term of this patent is extended or adjusted under 35 U.S.C. 154(b) by 196 days.

(21) Appl. No.: 16/239,660

(22) Filed: Jan. 4, 2019

(65) Prior Publication Data
US 2019/0213362 A1    Jul. 11, 2019

(30) Foreign Application Priority Data
Jan. 5, 2018    (KR) .................... 10-2018-0001524

(51) Int. Cl.
   *G06K 7/00*    (2006.01)
   *G06K 7/08*    (2006.01)
(52) U.S. Cl.
   CPC ........... *G06K 7/0095* (2013.01); *G06K 7/083* (2013.01)
(58) Field of Classification Search
   CPC .. G06K 7/0095; G06K 7/083; G06K 7/10336; G06K 7/01; G06K 7/015; G06K 7/086; G06K 7/10316; G06K 7/10425; G06K 7/10435; G06K 7/10445; G06K 19/0722; G06K 19/0723;
   (Continued)

(56) References Cited

U.S. PATENT DOCUMENTS 6,104,291 A * 8/2000 Beauvillier .......... G06K 7/0095
                                                          340/572.1
9,934,414 B1 * 4/2018 Lee .................... G06K 7/10435
(Continued)

FOREIGN PATENT DOCUMENTS

| | | |
|---|---|---|
| JP | 2008077283 A | 4/2008 |
| KR | 10-1572615 A | 11/2015 |
| KR | 10-1625590 B1 | 5/2016 |

*Primary Examiner* — Thien M Le
*Assistant Examiner* — April A Taylor
(74) *Attorney, Agent, or Firm* — Muir Patent Law, PLLC

(57) ABSTRACT

A test system is provided. The test system includes a test board provided with a near filed communication chip and including an antenna; a tag holding apparatus including first and second tag holders accommodating first and second NFC tags, respectively, and a first controller configured to adjust a position of each of the first and second tag holders; and a second controller configured to: transmit a first test signal to the test board to perform a first communication test for the NFC chip and the first NFC tag; receive a result of the first communication test; and determine whether or not the NFC chip normally reads first data stored in the first NFC tag. The first controller is configured to place the first NFC tag and the antenna to be spaced apart from each other by a first distance based on a type of the first NFC tag and face each other, and rotate the first and second tag holders when the first communication test is completed.

19 Claims, 14 Drawing Sheets

(58) Field of Classification Search
CPC ........ H04B 17/15–19; H04B 17/20–21; H04B 17/0085; H04B 5/0056; H04B 5/0062; H04B 5/0068; G01R 31/2822
See application file for complete search history.

(56) References Cited

U.S. PATENT DOCUMENTS

2005/0159906 A1\* 7/2005 Tada .................. G06K 7/10465
702/57
2007/0279212 A1\* 12/2007 Hong ................... G06K 7/0095
340/514

\* cited by examiner

TEST APPARATUS, TEST SYSTEM INCLUDING TEST APPARATUS, TEST METHOD USING TEST APPARATUS AND TEST SYSTEM, AND METHOD OF MANUFACTURING INTEGRATED CIRCUIT

This application claims priority under 35 U.S.C. § 119 to Korean Patent Application No. 10-2018-0001524, filed on Jan. 5, 2018, in the Korean Intellectual Property Office, the disclosure of which is incorporated herein by reference in its entirety.

BACKGROUND

1. Field of the Inventive Concept

Example embodiments according to the present inventive concept relate to a test apparatus, a test system including the test apparatus, a test method using the test apparatus and the test system, and a method of manufacturing an integrated circuit.

2. Description of the Related Art

In order to determine whether or not a product to which a near field communication (NFC) technology is applied operates normally, it may be necessary to test the communication between an NFC tag and the product to which an NFC technology is applied.

For example, in a communication test between an NFC chip and an NFC tag, the distance between an NFC tag and an NFC antenna that performs the near field wireless communication may differ from each other depending on the type of the NFC tag being tested. Further, in the communication test between an NFC chip and an NFC tag, it may be useful to test communication between each of commercially available various types of NFC tags and one NFC chip.

SUMMARY

An aspect of the present inventive concept is to provide a test apparatus capable of improving the convenience of a communication test between an NFC chip and a near filed communication tag, a test system including the test apparatus, a test method using the test apparatus and the test system, and a method of manufacturing an integrated circuit.

Another aspect of the present inventive concept is to provide a test apparatus capable of improving the accuracy of a communication test between an NFC chip and a near filed communication tag, a test system including the test apparatus, a test method using the test apparatus and the test system, and a method of manufacturing an integrated circuit.

However, aspects of the present inventive concept are not restricted to the one set forth herein. The above and other aspects of the present inventive concept will become more apparent to one of ordinary skill in the art to which the present inventive concept pertains by referencing the detailed description of the present inventive concept given below.

According to some embodiments of the inventive concept, there is provided a test system, comprising, a test board provided with a near filed communication (NFC) chip and comprising an antenna; a tag holding apparatus comprising first and second tag holders accommodating first and second NFC tags, respectively, and a first controller configured to adjust a position of each of the first and second tag holders; and a second controller configured to: transmit a first test signal to the test board to perform a first communication test for the NFC chip and the first NFC tag; receive a result of the first communication test; and determine whether or not the NFC chip normally reads first data stored in the first NFC tag, wherein the first controller is configured to place the first NFC tag and the antenna to be spaced apart from each other by a first distance based on a type of the first NFC tag and face each other, and rotate the first and second tag holders when the first communication test is completed.

According to some embodiments of the inventive concept, there is provided a test apparatus, comprising, a support, a first tag holder connected with the support and accommodating a first near field communication (NFC) tag; and a second tag holder connected with the support and accommodating a second NFC tag, wherein the first tag holder and the second tag holder are configured to rotate about an axis, wherein the test apparatus is configured to move the first tag holder to adjust a first distance between the first NFC tag and a test board including an NFC chip based on a type of the first NFC tag, and wherein the test apparatus is configured to move the second tag holder to adjust a second distance between the second NFC tag and the test board based on a type of the second NFC tag different from the type of the first. NFC tag.

According to some embodiments of the inventive concept, there is provided a test method, comprising controlling a position of a first near field communication (NFC) tag such that an antenna included in a test board and the first NFC tag are spaced from each other by a first distance and face each other; controlling a first communication test in which an NFC chip included in the test board reads first data stored in the first NFC tag; and controlling a position of a second NFC tag such that the antenna and the second NFC tag are spaced from each other by a second distance and face each other by rotating the first NFC tag about an axis after the first communication test is performed, wherein rotating of the first NFC tag includes rotating the first and second tag holders by the same angle in the same direction by rotating the support about the axis.

According to some embodiments of the inventive concept, there is provided a method of manufacturing an integrated circuit, comprising, generating a mask layout for a feature set of a layer of an integrated circuit, the mask layout including a standard cell library macro for one or more circuit features including a processor, ignoring a relative position of the standard cell library macro for compliance with a layout design rule during the generation of the mask layout, inspecting the relative position of the standard cell library macro for compliance with the layout design rule after the generation of the mask layout, modifying any standard cell library macro not complying with the layout design rule, among the standard cell library macros, to modify the mask layout to comply with the layout design rule, generating a mask in accordance with the modified mask layout having a feature set of the layer of the integrated circuit and manufacturing the layer of the integrated circuit in accordance with the mask, wherein the processor controls the position of a first near field communication (NFC) tag such that an antenna included in a test board and the first NFC tag are spaced from each other by a first distance and face each other; controls a first communication test in which an NFC chip included in the test board reads first data stored in the first NFC tag; and controls the position of a second NFC tag such that the antenna and the second NFC tag are spaced from each other by a second distance and face each other by rotating the first NFC tag about an axis, after the first communication test is performed.

According to some embodiments of the inventive concept, there is provided a test method, comprising providing a near filed communication (NFC) chip onto a test board having an antenna; providing a tag holding apparatus having a first tag holder accommodating a first type of NFC tag and a second tag holder accommodating a second type of NFC tag different from the first type of NFC tag; controlling a position of each of the first and second tag holders; transmitting a first test signal to the test board to perform a first communication test for the NFC chip and the first NFC tag; receiving a result of the first communication test; and determining whether or not the NFC chip normally reads first data stored in the first NFC tag, wherein the step of controlling comprises: placing the first NFC tag and the antenna to be spaced apart from each other by a first distance corresponding to the type of the first NFC tag and face each other; and rotating the first and second tag holders when the first communication test is completed.

BRIEF DESCRIPTION OF THE DRAWINGS

The above and other aspects and features of the present inventive concept will become more apparent by describing in detail exemplary embodiments thereof with reference to the attached drawings, in which.

DETAILED DESCRIPTION

Hereinafter, embodiments of the present inventive concept will be described with reference to the attached drawings.

Figure 1:
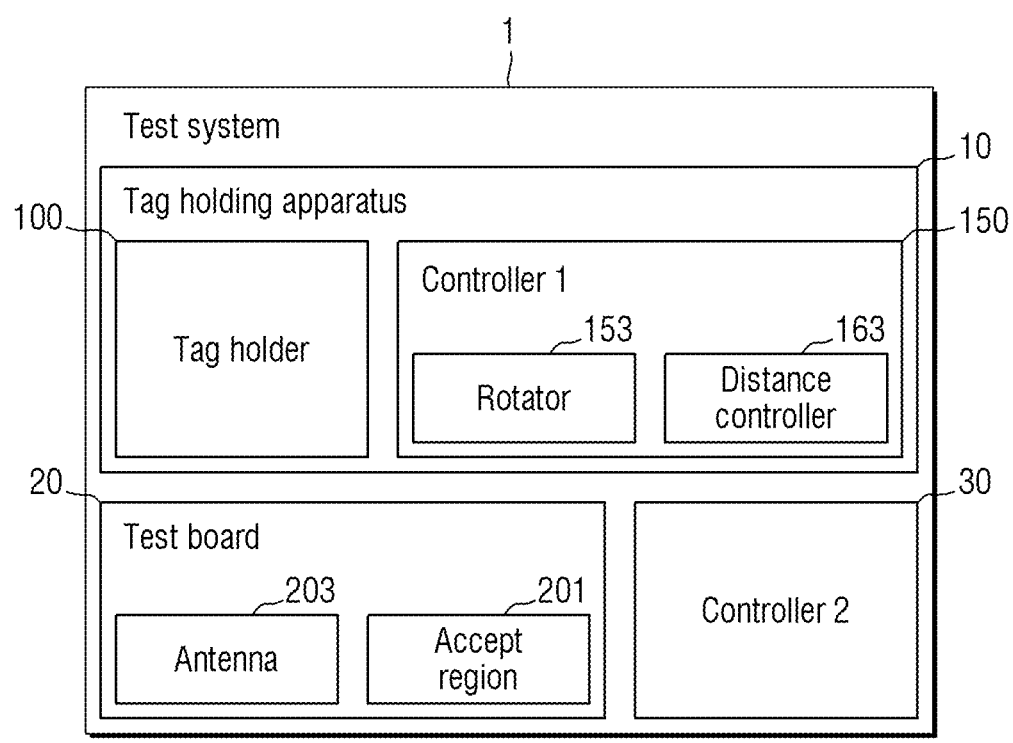
FIG. 1 is a block diagram illustrating a test system according to some embodiments of the present inventive concept.

FIG. 1 is a block diagram illustrating a test system 1 according to some embodiments of the present inventive concept.

Referring to FIG. 1, a test system 1 according to some example embodiments of the present inventive concept may include a tag holding apparatus 10 including a first controller 150, a test board 20, and a second controller 30.

According to example embodiments, the tag holding apparatus 10 may include a tag holder array 100 and the first controller 150.

The tag holder array 100 may accommodate NFC tags. The tag holder array 100 may include a plurality of tag holders. When the tag holder array 100 includes a plurality of tag holders, the tag holder array 100 may accommodate a plurality of types of NFC tags. Each of the plurality of tag holders may accommodate one NFC tag. According to example embodiments, an NFC tag may be passive device (with no power of its own) that can be used to communicate with an active NFC device (an active NFC reader/writer), e.g., smartphones, tablets, etc. For example, NFC tags may be passive storage devices which store data (e.g., small amount of data that may be used to direct the active NFC device to a website URL, text data, or other data) which can be read, and under some circumstances written to, by an active NFC device. A typical NFC tag may contain data between 96 bytes and 8,192 bytes) and are generally read-only in normal use, but may be rewritable. There are typically seven types of NFC tags each having a different format and/or storage capacity.

The first controller 150 may adjust the position of the tag holder array 100. For example, the first controller 150 may adjust a distance between the tag holder array 100 and the test board 20 to be described later. Further, the first controller 150 may rotate the tag holder array 100 about a predefined rotational axis.

The first controller 150 may include, for example, a rotator 153 and a distance controller 163.

The rotator 153 may rotate the tag holder array 100 about the rotational axis. The distance controller 163 may adjust the distance between the tag holder array 100 and the test board 20. Although it is shown in FIG. 1 that the first controller 150 includes only the rotator 153 and the distance controller 163, the present inventive concept is not limited thereto. For example, the first controller 150 may further include other components such as a power supply unit and a support, if necessary.

The test board 20 may include an accept region (accommodation area) 201 and an antenna 203. The accept region 201 of the test board 20 may be a part of a substrate included in the test board 20. An NFC chip may be disposed in the accept region 201 of the test board 20.

The antenna 203 may be connected to a substrate included in the test board 20. The antenna 203 may participate in the wireless communication between an NFC tag accommodated in the tag holder array 100 and an NFC chip disposed in the accept region 201. The NFC tags accommodated in the tag holder array 100 may be disposed on the antenna 203 to be spaced apart from each other at distances in accordance with the type of the NFC tag. Details thereof will be described later. The second controller 30 may transmit a test signal to the test board 20. The test signal may include information for performing a communication test for the NFC tag accommodated in the tag holder array 100 and the NFC chip disposed in the accept region 201.

The second controller 30 may receive the result of the communication test.

The second controller 30 may determine whether or not the communication between the NFC chip and the NFC tag is normal, based on the result of the communication test. For example, the second controller 30 may determine whether or not the NFC chip normally reads (e.g., whether the communication speed of the subject NFC chip is within a range of a predetermined acceptable rate of communication) the data stored in the NFC tag. Details thereof will be described later.

Figure 2:
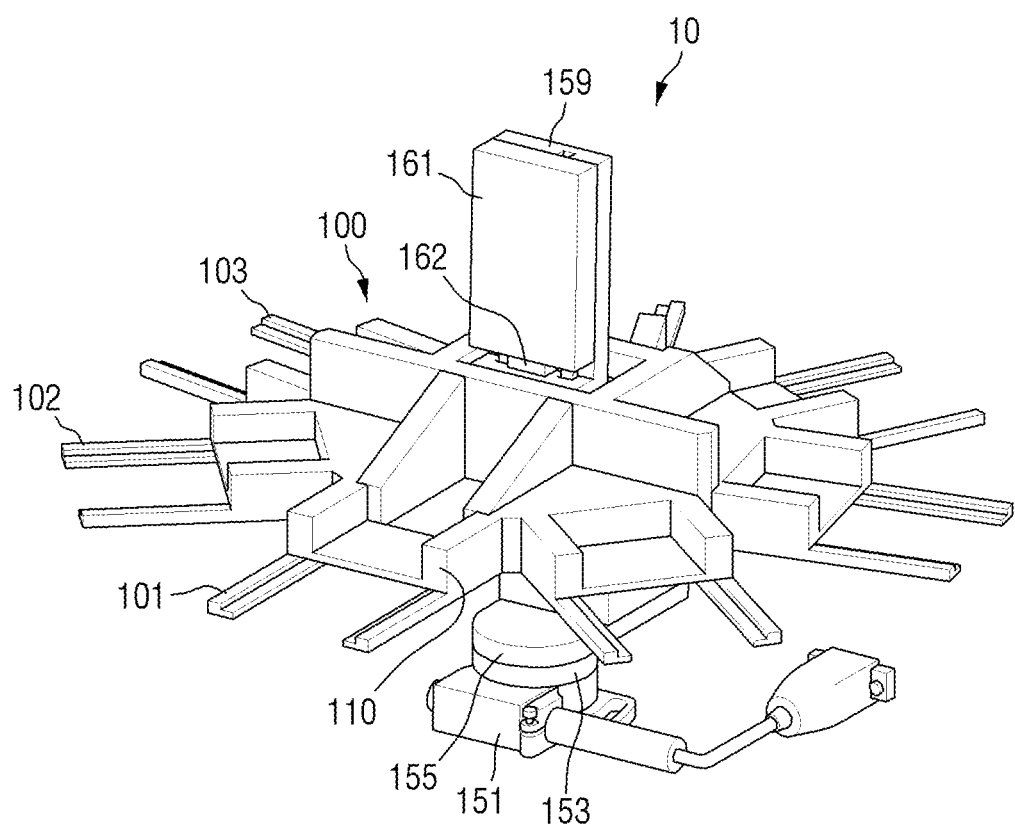
FIG. 2 is a view illustrating a tag holding apparatus according to some embodiments of the present inventive concept.
Figure 3:
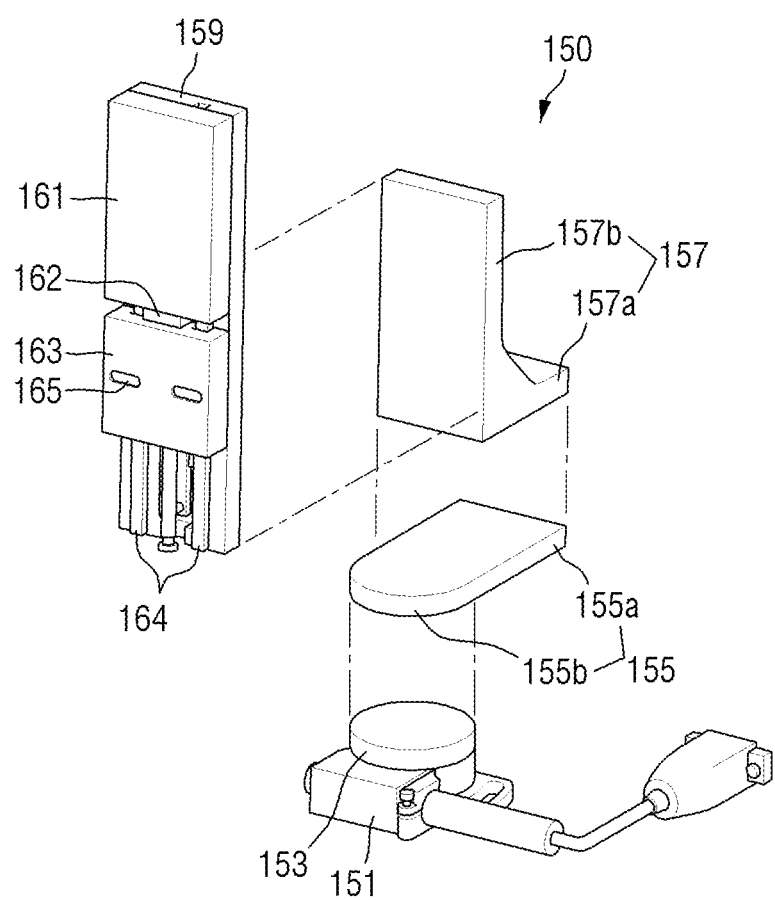
FIGS. 3 and 4 are views illustrating a first controller according to some embodiments of the present inventive concept.
Figure 4:
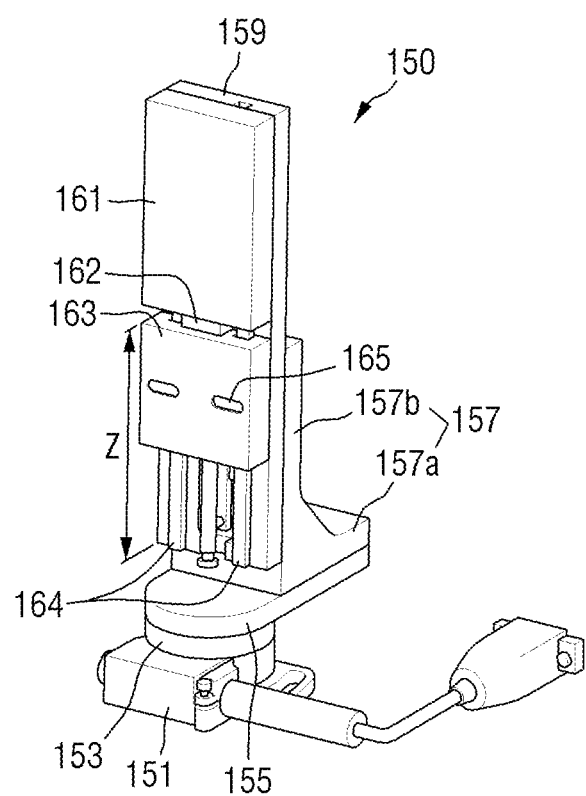

FIG. 2 is a view illustrating a tag holding apparatus 10 according to some embodiments of the present inventive concept. FIGS. 3 and 4 are views illustrating a first controller 150 according to some embodiments of the present inventive concept, in which FIG. 3 is an exploded perspective view of the first controller 150 of FIG. 2, and FIG. 4 is a perspective view of the first controller 150 of FIG. 2.

Referring to FIGS. 2 to 4, a tag holding apparatus 10 according to some embodiments of the present inventive concept may include a tag holder array 100 and a first controller 150.

The tag holder array 100 may accommodate NFC tags. The tag holder array 100 may include a tag holder support 110 and a plurality of tag holders connected to the tag holder support 110.

The plurality of tag holders may include first, second, and third tag holders 101, 102, and 103, respectively. The first, second, and third tag holders 101, 102, and 103 may protrude outwardly from the tag holder support 110. Each of the first, second, and third tag holders 101, 102, and 103 may accommodate an NFC tag.

Although it is shown in the drawings that the tag holder array 100 has a predetermined number of tag holders, the present inventive concept is not limited thereto. If necessary, the number of tag holders may be larger or smaller than the number of tag holders shown in the drawings.

The tag holder array 100 may be engaged (e.g., connected) with the first controller 150. For example, the first controller 150 may penetrate the tag holder array 100 to be engaged with the tag holder array 100. For example, the first controller 150 and the tag holder array 100 may be engaged (e.g., connected) with each other through a second connector 165 of the first controller 150.

It will be understood that, although the terms first, second, third etc. may be used herein to describe various elements, components, regions, layers and/or sections, these elements, components, regions, layers and/or sections should not be limited by these terms. Unless the context indicates otherwise, these terms are only used to distinguish one element, component, region, layer or section from another element, component, region, layer or section, for example as a naming convention. Thus, a first element, component, region, layer or section discussed below in one section of the specification could be termed a second element, component, region, layer or section in another section of the specification or in the claims without departing from the teachings of the present invention. In addition, in certain cases, even if a term is not described using "first," "second," etc., in the specification, it may still be referred to as "first" or "second" in a claim in order to distinguish different claimed elements from each other.

It will be understood that when an element is referred to as being "connected" or "coupled" to or "on" another element, it can be directly connected or coupled to or on the other element or intervening elements may be present. In contrast, when an element is referred to as being "directly connected" or "directly coupled" to another element, or as "contacting" or "in contact with" another element, there are no intervening elements present at the point of contact.

The first controller 150 may include a power supply unit 151, a rotator 153, a plate 155, a bracket 157, a first support 159, a second support 161, a first connector 162, a distance controller 163, a rail 164, and a second connector 165.

The power supply unit 151 may supply a power to the rotator 153 and the distance controller 163. For example, the power supply unit 151 may be connected to an external power supply to supply a power to the rotator 153 and the distance controller 163.

The rotator 153 may be disposed on the power supply unit 151. The rotator 153 may be engaged with the power supply unit 151. The rotator 153 may rotate on the power supply unit 151.

The power supply unit 151 according to some exemplary embodiments may include circuit components configured to generate or convert power and supply the power to the rotator 153.

The plate 155 may be disposed on the rotator 153. For example, the plate 155 may be coupled to the rotator 153. A part of the plate 155 may protrude from the rotator 153 and extend longitudinally in a predetermined direction. The plate 155 may rotate together with the rotation of the rotator 153. The plate 155 may connect the bracket 157 and the rotator 153. In some alternative embodiments, the plate 155 may be omitted.

The bracket 157 may be disposed on the plate 155. For example, the bracket 157 may be engaged with the plate 155. The plate 155 may include first part 155a and second part 155b. According to example embodiments, the first part 155a of the plate 155 may be rectangular or square in shape on one end and the second part 155b may be generally circular in shape on one end, but the disclosure is not limited thereto. The rotator 153 may include a circular top surface, and a bottom surface of the second part 155b of the plate 155 may be coupled to the circular top surface of the rotator 153 and one side of the first part 155a of the plate 155 may protrude inwardly opposite to the outward direction of protrusion of the first part 155b. The second part 155b may be aligned with an axis of rotation of the rotator 153 and tag holder support 110, while the first part 155a is not aligned with the axis of rotation of the rotator 153 and tag holder support 110. The bracket 157 may include a first portion 157a in contact with the plate 155 and a second portion 157b extending in a vertical direction from the first portion 157a. For example, a bottom surface of the first portion 157a of the bracket 157 may be in contact with the entire top surface of the first part 155a of the plate 155 and some part of the top surface of the second part 155b of the plate 155. According to example embodiments, side surfaces of the first portion 157a of the bracket 157 may be positioned in the same plane as the side surfaces of the first part 155a of the plate 155. The first part 155a and second part 155b of the plate 155 may be connected to each other to integrally form the plate 155. The first portion 157a and second portion 157b of the bracket 157 may be connected to each other to integrally form the bracket 157. The bracket 157 may connect the first support 159 and the plate 155.

The first support 159 may be engaged to the second portion 157b of the bracket 157 and may be disposed on the rotator 153. For example, the bracket 157 may be disposed on one side of the first support 159 such that an inner vertical surface of the first support 159 contacts an outer vertical surface of the second portion 157b of the bracket 157. According to example embodiments, side surfaces of the first support 159 may be positioned in the same plane as the side surfaces of the second portion 157b of the bracket 157. The first support 159 may be a rectangular shaped plate having a flat surface to engage the second portion 157b of the bracket 157. However, the disclosure is not limited thereto. The second support 161, the first connector 162, the distance controller 163, the rail 164, and the second connector 165 may be disposed on the other side of the first support 159. For example, an outer vertical surface of the first support 159 may contact inner vertical surfaces of the second support 161 and the distance controller 163 and the outer vertical surface of the first support 159 may contact the first connector 162, the rail 164 and the second connector 165. According to example embodiments, a top end of the rail 164 may be connected to the bottom surface of the distance controller 163 and first connector 162 may be disposed between an upper surface of the distance controller 163 and a lower surface of the second support 161, and the second connector 165 may be disposed at a middle portion of the distance controller 163. Although the exemplary embodiment of FIG. 3 illustrates two second connectors 165 disposed spaced apart from each other at a middle portion of the distance controller 163, the disclosure is not limited thereto. Any number of second connectors 165 may be disposed on the distance controller 163 depending on design specifications.

In some embodiments, the bracket 157 and the first support 159 may be integrally formed, and may be collectively referred to as a bracket.

The second support 161 may be engaged with the first support 159. The second support 161 may be connected to the distance controller 163 through the first connector 162.

The second support 161 may generate a control signal for controlling the distance controller 163. For example, the second support 161, also referred to as a support plate, may include body that encases circuit components and actuator components that actuate the distance controller 163 to move it along the rail 164. The generated control signal is transmitted to the distance controller 163 through the first connector 162 such that the position of the distance controller 163 in the Z direction may be adjusted. However, the technical idea of the present inventive concept is not limited thereto. For example, the control signal for controlling the distance controller 163 may also be generated from a component that is separated from the second support.

The distance controller 163 may move along the Z direction on the other side of the first support 159. For example, the distance controller 163 may move up and down along the rail 164 on the rail 164. Here, the up-and-down motion may be a movement along the Z direction. For example, the distance controller 163 may move on the rail 164 along the direction in which the first support 159 extends.

The second connector 165 may engage the distance controller 163 and the tag holder 100 with each other. Accordingly, as the distance controller 163 moves on the rail 164 along the Z direction, the tag holder 100 may move together with the distance controller 163 along the Z direction. For example, when the distance controller 163 moves up and down, the tag holder 100 may also move up and down.

Since the tag holder 100, the plate 155, the bracket 157, the first support 159, the second support 161, the first connector 162, and the distance controller 163 are connected to the rotator 153, as the rotator 153 rotates along a radial axis, the tag holder 100, the plate 155, the bracket 157, the first support 159, the second support 161, the first connector 162, and the distance controller 163 may also rotate along the radial axis together with the rotator 153.

Thus, according to example embodiments, the first controller 150 may adjust the distance between the tag holder array 100 and the test board 20, spaced apart from each other, through the distance controller 163, and may rotate the tag holder array 100 through the rotator 153.

Figure 5:
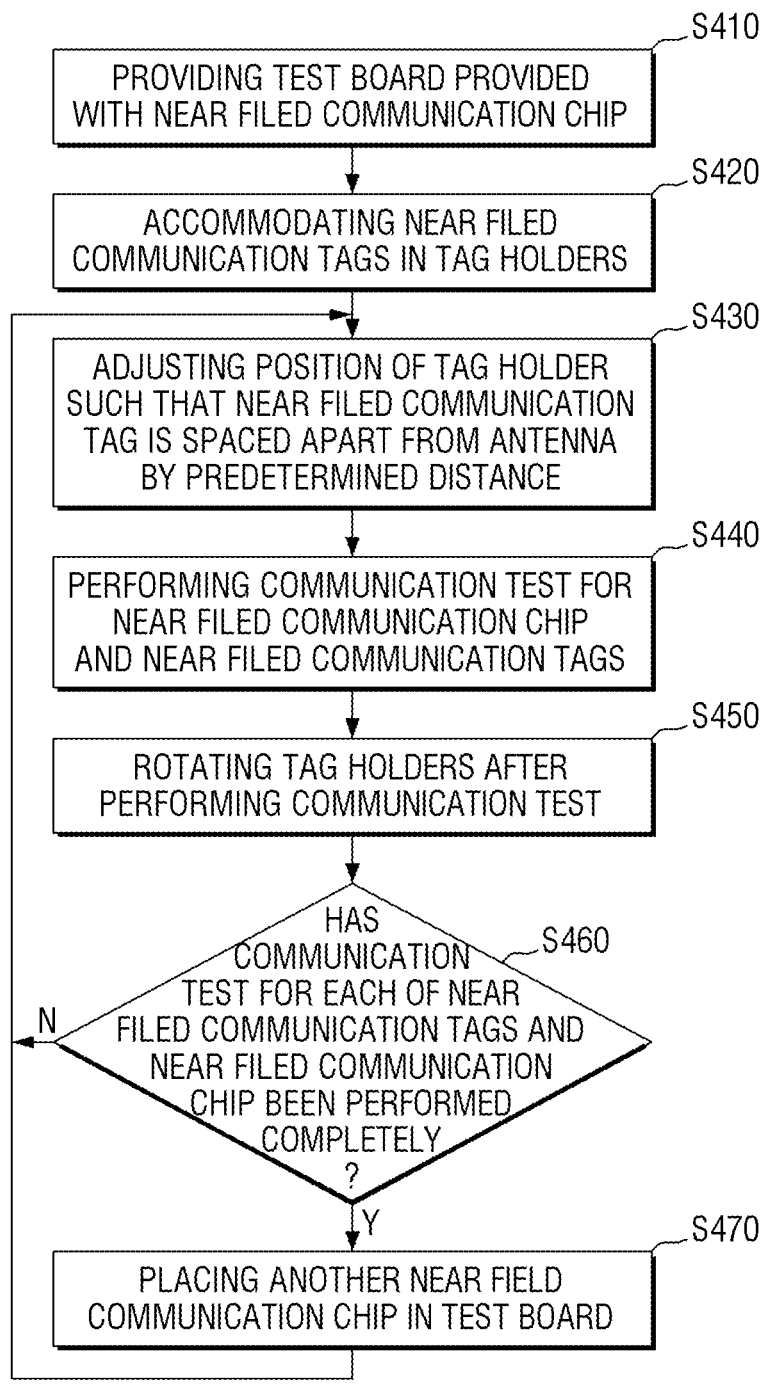
FIG. 5 is a flowchart illustrating a test method using the test system according to some embodiments of the present inventive concept.
Figure 6:
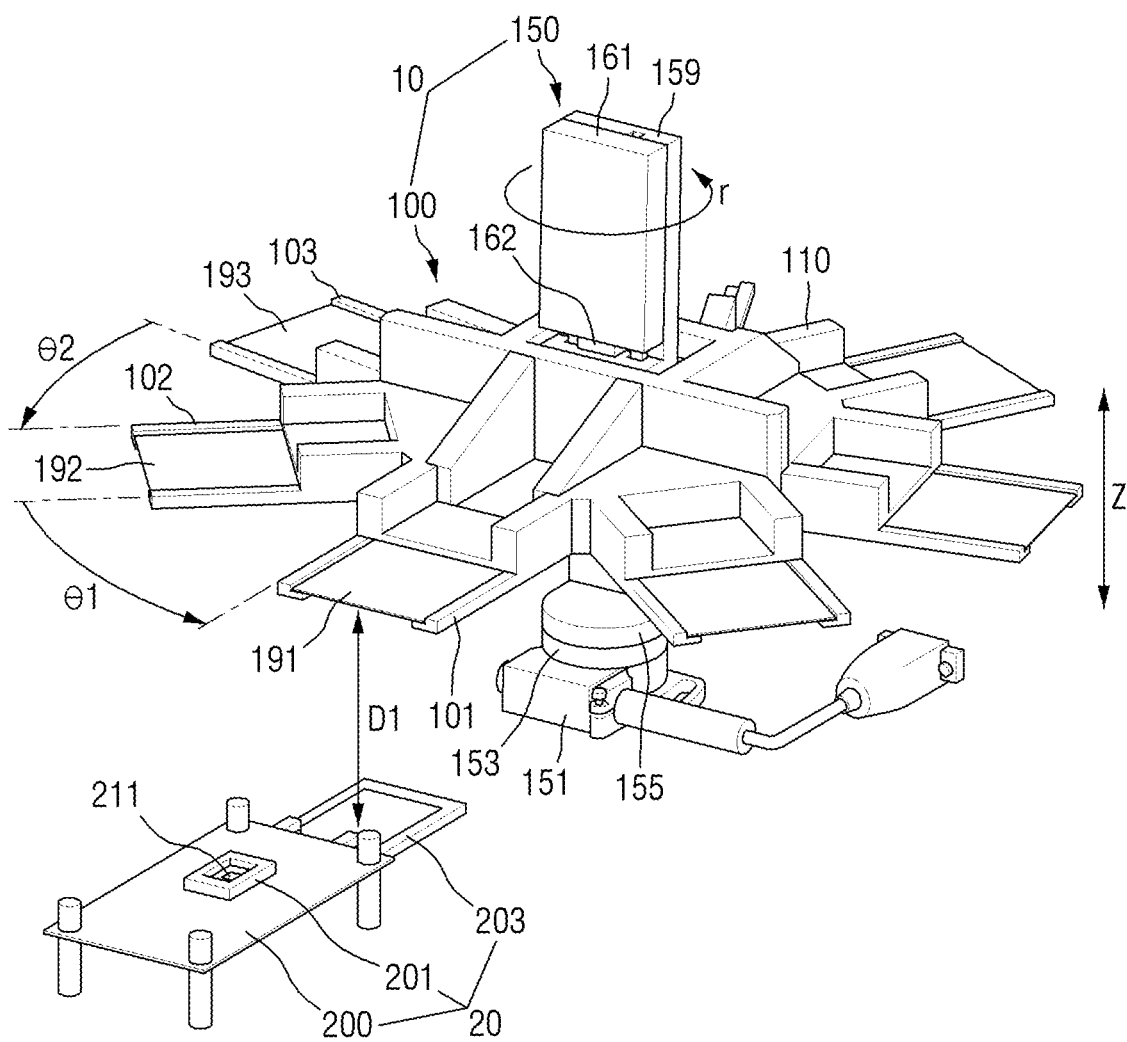
FIGS. 6 to 8 are views illustrating the operation of the tag holding apparatus according to some embodiments of the present inventive concept.
Figure 7:
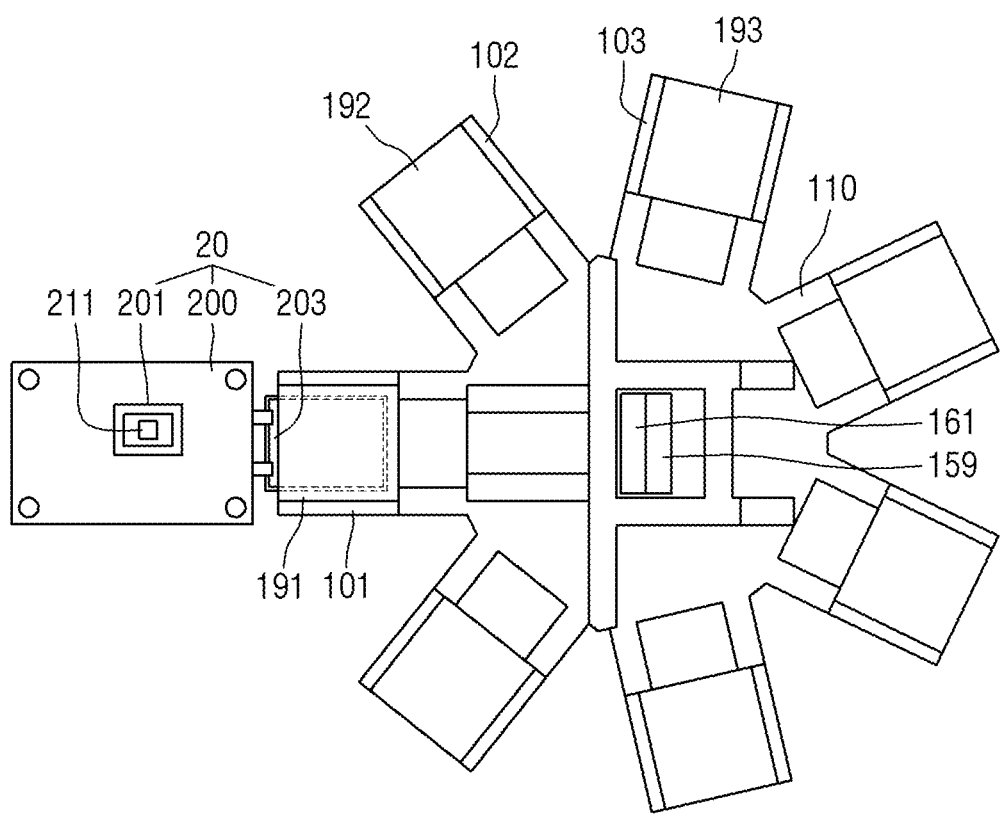
Figure 8:
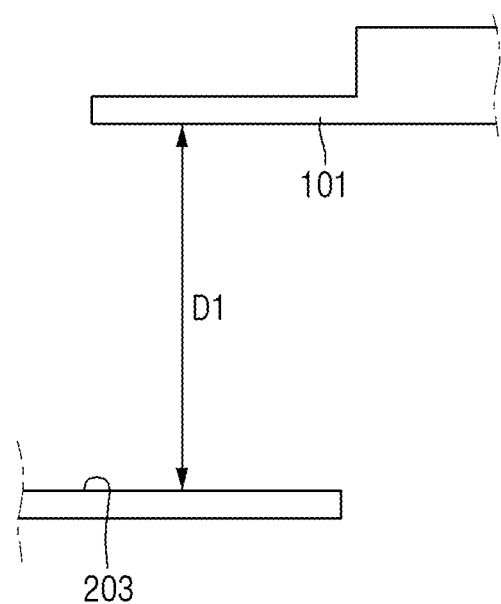

FIG. 5 is a flowchart illustrating a test method using the test system 1 according to some embodiments of the present inventive concept. FIGS. 6 to 8 are views illustrating the operation of the tag holding apparatus 10 according to some embodiments of the present inventive concept, in which FIG. 7 is a plan view of the test system 1 of FIG. 6, and FIG. 8 is a side view of an antenna 203 and a first tag holder 101. In FIG. 8, for the sake of clarity, other components, except for the antenna 203 and the first tag holder 101, are omitted.

Figure 9:
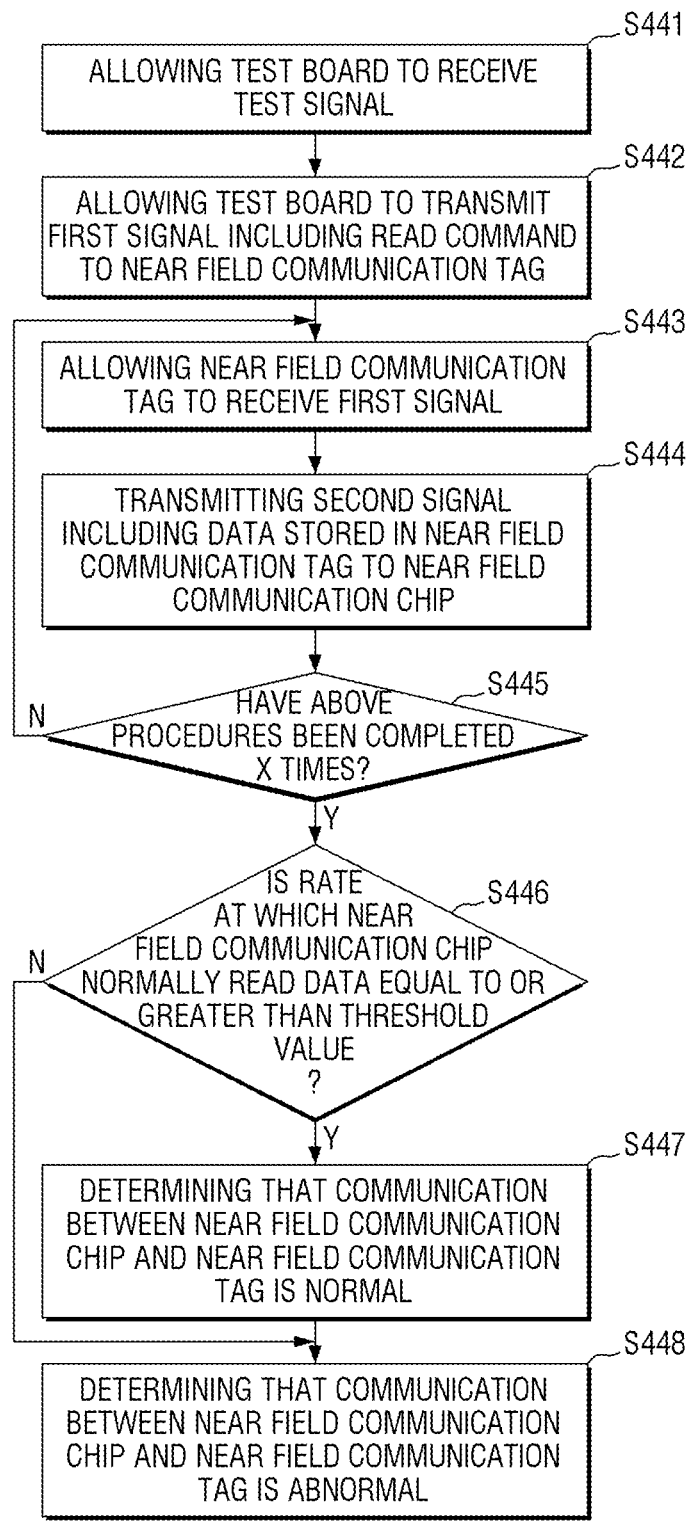
FIG. 9 is a flowchart illustrating the step (S440) of FIG. 5.

FIG. 9 is a flowchart illustrating the step (S440) of FIG. 5.

Figure 10:
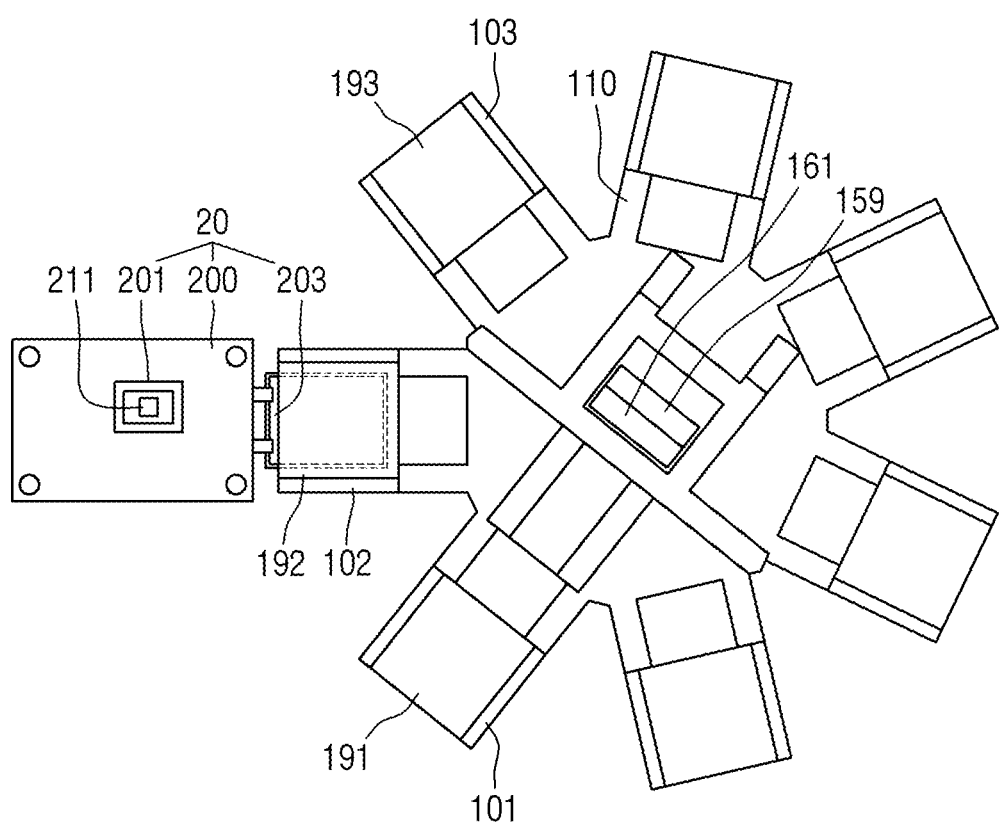
FIGS. 10 to 13 are views illustrating the operation of the tag holding apparatus according to some embodiments of the present inventive concept.
Figure 11:
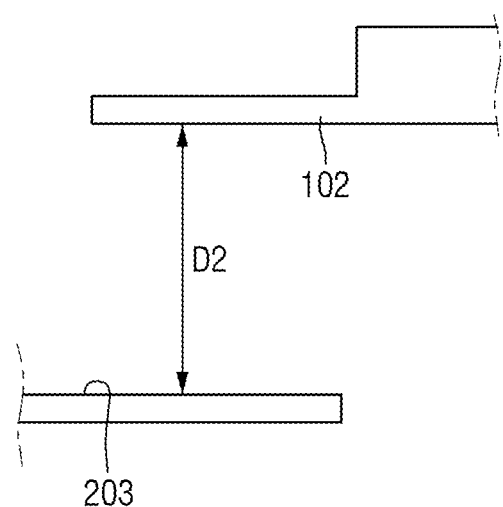

FIGS. 10 to 13 are views illustrating the operation of the tag holding apparatus 10 according to some embodiments of the present inventive concept. Specifically, FIG. 10 is a plan view of the test system 1 after the tag holding apparatus 10 of FIG. 7 rotates in the r direction by a first angle θ1, and FIG. 11 is a side view of an antenna 203 and a second tag holder 102. In FIG. 11, for the sake of clarity, other components, except for the antenna 203 and the second tag holder 102, are omitted.

Figure 12:
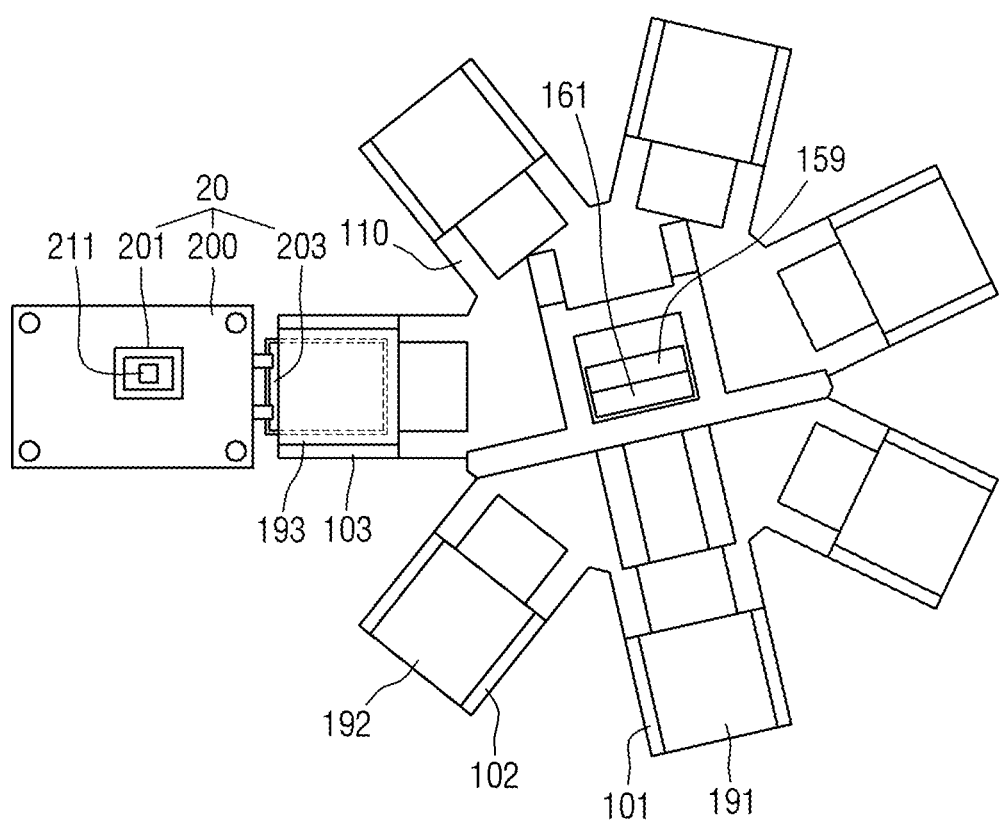
Figure 13:
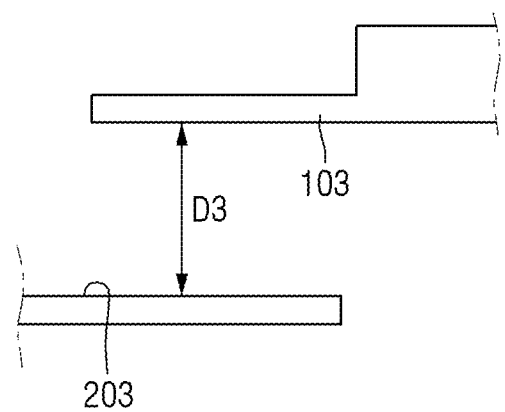

FIG. 12 is a plan view of the test system 1 after the tag holding apparatus 10 of FIG. 7 rotates in the r direction by a second angle θ2, and FIG. 13 is a side view of an antenna 203 and a third tag holder 103. In FIG. 13, for the sake of clarity, other components, except for the antenna 203 and the third tag holder 103, are omitted.

Referring to FIG. 5, in step S410, a test board in which an NFC chip is disposed may be provided.

Referring to FIG. 6, a test board 20 in which an NFC chip 211 is disposed may be provided. The test board 20 may include a substrate 200, an accept region 201, and an antenna 203. The accept region 201 may be a part of the substrate 200. The antenna 203 may be connected with the substrate 200.

For a first communication test between the NFC chip 211 and a first tag 191, the NFC chip 211 may be disposed in the accept region 201 of the test board 20.

Referring to FIG. 5 again, in step S420, a plurality of NFC tags may be accommodated in a plurality of tag holders, respectively.

Referring to FIG. 6 again, first, second, and third NFC tags 191, 192, and 193 may be accommodated in the first, second, and third tag holders 101, 102, and 101 of the tag holding apparatus 10, respectively.

In some embodiments, the first, second, and third NFC tags 191, 192, and 193 may be different types of tags.

Referring to FIG. 5 again, in step S430, the position of a tag holder may be adjusted such that the NFC tag is spaced apart from the antenna by a predetermined distance.

Referring to FIGS. 6 to 8, the first NFC tag 191 accommodated in the first tag holder 101 may be spaced apart from the antenna 203 by a first distance D1, and the first NFC tag 191 and the antenna 203 face each other. In this case, the first controller 150 may control the first NFC tag 191 and the antenna 203 such that the first NFC tag 191 and the antenna 203 are be spaced apart from each other by a first distance D1 and face each other.

For example, the first tag holder 101 may move such that the distance controller 163 of the first controller 150 moves to allow the first NFC tag 191 and the antenna 203 to be spaced apart from each other by a first distance D1 and face each other. For example, the distance between the first NFC tag 191 and the antenna 203 may be adjusted to the first distance D1.

The first distance D1 may be, for example, a distance between the antenna 203 and the first NFC tag 191, which are spaced apart from each other. The first distance D1 may be a distance required to perform a first communication test for determining whether or not wireless communication between the first NFC chip 211 and the first NFC tag 191 is normal. The first distance D1 may be a value determined according to the type of the first NFC tag 191. In some embodiments, the first distance D1 may be a value determined according to the type of the first NFC tag 191, which is designated as an NFC test standard in the NFC forum.

Referring to FIG. 5 again, in step S440, a communication test for the NFC chip and the NFC tag may be performed.

Referring to FIG. 9, the communication test in step S440 of FIG. 5 may include steps S441 to S448.

In step S441 of FIG. 9, the communication test may include allowing the test board to receive a test signal.

In some embodiments, the second controller (30 of FIG. 1) may transmit a test signal to the test board 20. The test signal may include information for performing a first communication test for the NFC chip and the NFC tag.

In step S442 of FIG. 9, the communication test may include allowing the test board to transmit a first signal including a read command to the NFC tag.

Referring to FIG. 6 again, the test board 20 receiving the first test signal may transmit the first signal to the first NFC tag 191 to perform the first communication test.

The first communication test may be to test whether or not wireless communication between the first NFC chip 211 and the first NFC tag 191 is normally performed in a read mode of the first NFC chip 211. The read mode may include allowing the first NFC chip 211 to read first data stored in the first NFC tag 191.

The first signal, for example, may be transmitted to the first NFC tag 191 through the antenna 203.

Referring to FIG. 9 again, in step S443, the communication test may include allowing the NFC tag to receive the first signal.

Referring to FIG. 6 again, the first NFC tag 191 may receive a first signal including a read command.

Referring to FIG. 9 again, in step S444, the communication test may include transmitting a second signal including first data stored in the NFC tag to the NFC chip.

Referring to FIG. 6 again, the first NFC tag 191 may store first data. When the first NFC tag 191 receives the first signal including the read command, the first NFC tag 191 may transmit the second signal including the first data to the test board 20.

The second signal, for example, may be transmitted to the first NFC chip 211 disposed in the test board 20 through the antenna 203.

Referring to FIG. 9 again, in step S445, the communication test may be repeated X times. Here, X is a natural number. If the communication test has not been repeated X times, step S442, step S443, and step S444 may be performed again. If the communication test has been repeated X times, step S446 may proceed.

Referring to FIG. 6 again, the first communication test for the first NFC chip 211 and the first NFC tag 191 may be repeated X times.

In some embodiments, the second controller (30 of FIG. 1) may confirm whether or not the first communication test has been repeated X times.

In some embodiments, the first communication test may include a first sub-communication test and a second sub-communication test. The first sub-communication test may be a test in which the first NFC chip 211 and the first NFC tag 191 transmit and receive the first and second signals at a first rate. The second sub-communication test may be a test in which the first NFC chip 211 and the first NFC tag 191 transmit and receive the first and second signals at a second rate. The first speed and the second speed may be different values from each other.

Each of the first and second sub-communication tests may be repeated X times. For example, after the first sub-communication test is repeated X times, the second sub-communication test may be repeated X times. After the second sub-communication test is repeated X times, step S446 may proceed.

Referring to FIG. 9 again, in step S446, the communication test may include determining whether or not the rate at which the NFC chip normally reads the data is greater than or equal to a threshold value.

In the communication test repeated X times, the rate at which the NFC chip normally receives the second signal may be determined. For example, in the communication test repeated X times, the rate at which the NFC chip normally reads the data stored in the NFC tag may be determined.

If the rate is equal to or greater than a threshold value, it may be determined that the wireless communication between the NFC chip and the NFC tag is normal (step S447). If the rate is less than the threshold value, it may be determined that the wireless communication between the NFC chip and the NFC tag is abnormal (step S448). The rate is determined, thereby completing the communication test between the NFC chip and the NFC tag.

Referring to FIG. 6 again, in the first communication test repeated X times, the rate at which the first NFC chip 211 normally reads the first data stored in the first NFC tag 191 may be determined.

In some embodiments, the second controller (30 of FIG. 1) may determine the rate. The second controller (30 of FIG. 1) may compare the rate with the threshold value, thereby determining whether or not wireless communication between the first NFC chip 211 and the first NFC tag 191 is normal and completing the first communication test.

In some embodiments, steps S446, S447, and S448 may be performed after step S460.

Referring again to FIG. 5 again, in step S450, after the completion of the communication test, the tag holder may rotate. After the tag holder rotates, it may be determined in step S460 whether all of the communication tests between the NFC tags accommodated in the tag holder and the NFC chips have been completely performed. If all of the communication tests have not been performed, steps S430, S440, S450, and S460 may be performed again.

Referring again to FIG. 6 again, the first tag holder 101 and the second tag holder 102 may be spaced apart from each other by a first angle θ1, and the second tag holder 102 and the third tag holder 103 may be spaced apart from each other by a second angle θ2. In some embodiments, the first angle θ1 and the second angle θ2 may be the same value. In some embodiments, each of the first, second, and third tag holders 101, 102, 103 may rotate in the same direction (for example, r direction).

After the first communication test is completed, the first controller 150 may rotate the first, second, and third tag holders 101, 102, 103 in the r direction. At this time, each of the first, second, and third tag holders 101, 102, and 103 may rotate by the first angle θ1. The first controller 150 may rotate the rotator 153 of the first controller 150 to rotate the first, second, and third tag holders 101, 102 and 103 in the r direction.

In some embodiments, each of the first, second, and third tag holders 101, 102, and 103 may automatically rotate in the r direction. For example, the second controller (30 of FIG. 1) may command the first controller 150 to rotate the first, second, and third tag holders 101, 102 and 103, respectively, in the r direction, and the first controller 150 may control the rotator 153 to rotate.

Alternatively, in some embodiments, after the first communication test is completed, the first controller 150 may automatically rotate each of the first, second, and third tag holders 101, 102, 103 in the r direction.

Referring to FIG. 10, the second tag holder 102 may move such that the rotator 153 of the first controller 150 rotates to face the second NFC tag 192 and the antenna 203 each other. For example, when the rotator 153 rotates, the first support 159 rotates, and thus the tag holder array 100 connected with the first support 159 may rotate.

Referring to FIG. 11, the first, second, and third tag holders 101, 102, and 103 rotate, and thus the second NFC tag 192 accommodated in the second tag holder 102 may be disposed so as to be spaced apart from the antenna 203 by a second distance D2 and face the antenna 203. In this case, the first controller 150 may control the second NFC tag 192 and the antenna 203 to be spaced apart from each other by the second distance D2 and face each other.

For example, the second tag holder 102 may move such that the distance controller 163 of the first controller 150 moves to allow the second NFC tag 192 and the antenna 203 to be spaced apart from each other by a second distance D2 and face each other. For example, the distance between the second NFC tag 192 and the antenna 203 may be adjusted to the second distance D2.

The second distance D2 may be a distance required to perform a second communication test for determining whether or not wireless communication between the first NFC chip 211 and the second NFC tag 192 is normal. The second distance D2 may be a value determined according to the type of the second NFC tag 192. In some embodiments, the second distance D2 may be a value determined according to the type of the second NFC tag 192, which is designated as an NFC test standard in the NFC forum.

After the second distance D2 is adjusted, a second communication test for the first NFC chip 211 and the second NFC tag 192 may be performed.

In some embodiments, after the second distance D2 is adjusted, the second controller (30 of FIG. 1) may transmit a second test signal to the test board 20 to perform a second communication test for the first NFC chip 211 and the second NFC tag 192. Further, the second controller (30 of FIG. 1) may receive the result of the second communication test, and may determine whether or not the NFC chip 211 normally reads the second data stored in the second NFC tag 192.

Since the contents of the second communication test are substantially the same as those of the communication test (for example, the first communication test) described with reference to FIG. 9, a repetitive description will be omitted.

Referring to FIGS. 6 and 12, after the second communication test is completed, the first controller 150 may rotate the first, second, and third tag holders 101, 102, 103 in the r direction. At this time, each of the first, second, and third tag holders 101, 102, and 103 may rotate by the second angle θ2.

For example, the third tag holder 103 may move such that the rotator 153 of the first controller 150 rotates to face the third NFC tag 193 and the antenna 203 to face each other. For example, when the rotator 153 rotates, the first support 159 rotates, and thus the tag holder array 100 connected with the first support 159 may rotate.

Referring to FIG. 13, the first, second, and third tag holders 101, 102, and 103 rotate, and thus the third NFC tag 193 accommodated in the third tag holder 103 may be disposed so as to be spaced apart from the antenna 203 by a third distance D3 and face the antenna 203. In this case, the first controller 150 may control the third NFC tag 193 and the antenna 203 to be spaced apart from each other by the third distance D3 and face each other.

For example, the third tag holder 103 may move such that the distance controller 163 of the first controller 150 moves to allow the third NFC tag 193 and the antenna 203 to be spaced apart from each other by the third distance D3 and face each other. For example, the distance between the third NFC tag 193 and the antenna 203 may be adjusted to the third distance D3.

The third distance D3 may be a distance required to perform a third communication test for determining whether or not wireless communication between the first NFC chip 211 and the third NFC tag 193 is normal. The third distance D3 may be a value determined according to the type of the third NFC tag 193. In some embodiments, the third distance D3 may be a value determined according to the type of the third NFC tag 193, which is designated as an NFC test standard in the NFC forum.

After the third distance D3 is adjusted, a third communication test for the first NFC chip 211 and the third NFC tag 193 may be performed.

In some embodiments, after the third distance D3 is adjusted, the second controller (30 of FIG. 1) may transmit a third test signal to the test board 20 to perform a third communication test for the first NFC chip 211 and the third NFC tag 193. Further, the second controller (30 of FIG. 1) may receive the result of the third communication test, and may determine whether or not the NFC chip 211 normally reads the third data stored in the third NFC tag 193.

Since the contents of the third communication test are substantially the same as those of the communication test (for example, the first communication test) described with reference to FIG. 9, a repetitive description will be omitted.

Referring to FIG. 5 again, if the communication test for the NFC chip and the plurality of NFC tags has been completely performed in step S460, another NFC chip may be disposed in the test board in step S470. After another NFC chip is disposed in the test board, steps S430, S440, S450, and S460 may be performed again.

For example, when the communication test between each of the plurality of NFC tags accommodated in the tag holder array and the first NFC chip 211, which has been described with reference to FIGS. 6, 10, and 11, is completely performed, a second NFC chip may be disposed in the accept region 201. Further, the first NFC tag 191 may be disposed on the antenna 203 again. Thereafter, steps S430, S440, S450, and S460 of FIG. 5 may be performed.

The test system 1 according to some embodiments of the present inventive concept is configured such that the tag holders of the tag holding apparatus 10 as a test apparatus are moved in the z direction and the r direction, so as to improve the convenience of a communication test for the NFC chip and the NFC tag. Further, the test system 1 according to some embodiments of the present inventive concept is configured such that the tag holders of the tag holding apparatus 10 are spaced apart from the antenna 203 by a distance according to the type of an NFC tag, so as to improve the accuracy of a communication test for the NFC chip and the NFC tag.

The first distance D1, the second distance D2, and the third distance D3 may also be referred to as characteristic distances corresponding to respective types of NFC tags being used for testing whether the subject NFC chip is normal or abnormal. When it is determined that the wireless communication between the NFC chip and the NFC tag is normal as described above with respect to FIGS. 5-13, the subject NFC chip may be installed into an NFC enabled device, e.g., smartphones, tablets, etc. When it is determined that the wireless communication between the NFC chip and the NFC tag is abnormal, the subject NFC chip may be discarded and may not be installed into an NFC enabled device, e.g., smartphones, tablets, etc. According to exemplary embodiments, the read/write rate determination test for the subject NFC chip is performed automatically by the using the tag holding apparatus 10 and the test board 20 in which stepwise automatic rotation among the NFC tags is performed with characteristic distance and various test modes corresponding to the subject NFC chip, respectively. Accordingly, operator mistakes in existing manual assessments of NFC chips may be reduced and the test period may be shortened and accurate evaluation may be made regarding the normality or abnormality of the subject NFC chips.

Figure 14:
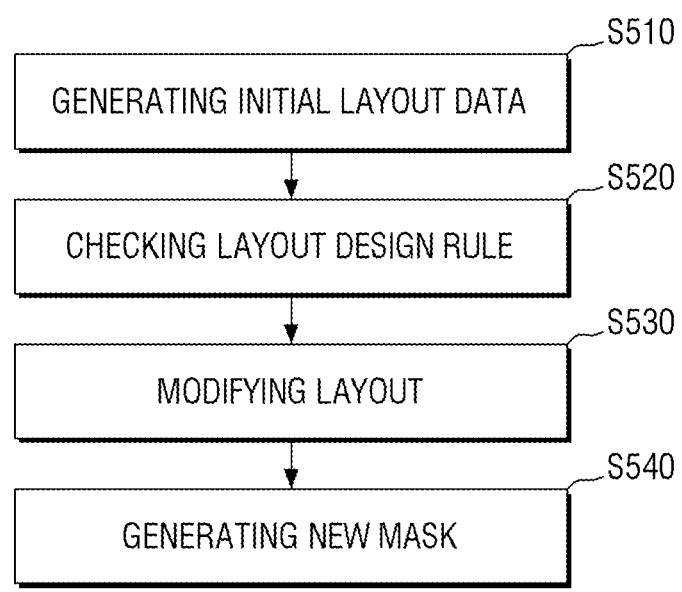
FIG. 14 is a flowchart illustrating a method of manufacturing an integrated circuit including a processor according to some embodiments of the present inventive concept.

FIG. 14 is a flowchart illustrating a method of manufacturing an integrated circuit including a processor according to some embodiments of the present inventive concept.

Referring to FIG. 14, in step S510, initial layout data for generating a mask layout for a feature set of a layer of an integrated circuit may be generated.

The mask layout may include a standard cell library macro for one or more circuit features including a processor.

The processor may control the position of the first NFC tag such that the antenna included in the test board and the first NFC tag are spaced apart from each other by a first distance and face each other. In addition, the processor may control the NFC chip included in the test board to perform a first communication test to read the first data stored in the first NFC tag. Moreover, after the first communication test is performed, the processor may rotate the first NFC tag to control the position of the second NFC tag such that the antenna and the second NFC tag are spaced by a second distance and face each other.

The processor may be implemented in hardware or in hardware programmed with software. According to example embodiments, the processor may be a CPU or other computing device implemented in hardware or in hardware programmed with software.

In step S520, design rule check for ignoring the relative position of the standard cell library macro for compliance with a layout design rule may be performed during the generation of the mask layout.

In step S530, layout modification for inspecting the relative position of the standard cell library macro for compliance with a layout design rule may be performed after the generation of the mask layout.

In step S540, when a new layout design is formed and it is detected whether or not the layout design rule is complied with any macro, the mask layout may be modified by modifying each macro not complying with the design rule to comply with the layout design rule. Further, a mask may be generated in accordance with the modified mask layout having a feature set of a layer of an integrated circuit, and an integrated circuit layer may be manufactured in accordance with the generated mask.

According to a software implementation, embodiments such as procedures or functions may be implemented with separate software modules that perform at least one function or operation.

Software codes may be implemented by a software application written in a suitable programming language.

As is traditional in the field of the inventive concepts, embodiments are described, and illustrated in the drawings, in terms of functional blocks, units and/or modules. Those skilled in the art will appreciate that these blocks, units and/or modules are physically implemented by electronic (or optical) circuits such as logic circuits, discrete components, microprocessors, hard-wired circuits, memory elements, wiring connections, and the like, which may be formed using semiconductor-based fabrication techniques or other manufacturing technologies. In the case of the blocks, units and/or modules being implemented by microprocessors or similar, they may be programmed using software (e.g., microcode) to perform various functions discussed herein and may optionally be driven by firmware and/or software. Alternatively, each block, unit and/or module may be implemented by dedicated hardware, or as a combination of dedicated hardware to perform some functions and a processor (e.g., one or more programmed microprocessors and associated circuitry) to perform other functions. Also, each block, unit and/or module of the embodiments may be physically separated into two or more interacting and discrete blocks, units and/or modules without departing from the scope of the inventive concepts. Further, the blocks, units and/or modules of the embodiments may be physically combined into more complex blocks, units and/or modules without departing from the scope of the inventive concepts.

While the present inventive concept has been particularly shown and described with reference to exemplary embodiments thereof, it will be understood by those of ordinary skill in the art that various changes in form and details may be made therein without departing from the spirit and scope of the present inventive concept as defined by the following claims. It is therefore desired that the present embodiments be considered in all respects as illustrative and not restrictive, reference being made to the appended claims rather than the foregoing description to indicate the scope of the invention.

What is claimed is:

1. A test system, comprising:
   a test board comprising an antenna connected to a near field communication (NFC) chip;
   a first tag holder accommodating a first NFC tag;
   a second tag holder accommodating a second NFC tag;
   a first controller configured to adjust a first distance between the first NFC tag and the test board and a second distance between the second NFC tag and the test board and to rotate the first tag holder and the second tag holder; and
   a second controller configured to transmit a first test signal to the test board to perform a first communication test for the NFC chip and the first NFC tag.

2. The test system of claim 1,
   wherein the first controller rotates the first and second tag holders after the first communication test is completed, and then adjusts the second distance between the second NFC tag and the test board based on a type of the second NFC tag different from the type of the first NFC tag and to face each other.

3. The test system of claim 2,
   wherein the second controller transmits a second test signal to the test board to perform a second communication test for the NFC chip and the second NFC tag after the second controller adjusts the second distance between the second NFC tag and the test board.

4. The test system of claim 1,
   wherein the first and second tag holders are connected with a support, and
   the first controller is configured to rotate the support to rotate the first and second tag holders.

5. The test system of claim 4,
   wherein the first and second tag holders move along a direction in which the support extends, and the first controller is configured to move the first tag holder along the direction in which the support extends, so that the first NFC tag and the antenna are spaced apart from each other by the first distance and face each other.

6. The test system of claim 4, further comprising a third tag holder accommodating a third NFC tag and connected with the support,
wherein the first controller configured to adjust a third distance between the third NFC tag and the test board and to rotate the support to rotate the third tag holder.

7. The test system of claim 6,
wherein the first tag holder and the second tag holder are spaced apart from each other by a first angle,
wherein the second tag holder and the third tag holder are spaced apart from each other by a second angle, and
wherein the first angle and the second angle are same value.

8. The test system of claim 6,
wherein the first controller configured to adjust the third distance between the third NFC tag and the test board based on a type of the third NFC tag different from the type of the second NFC tag and to face each other.

9. The test system of claim 1,
wherein the second controller configured to transmit the first test signal to the test board after the first controller adjusts the first distance between the first NFC tag and the test board.

10. A test apparatus, comprising:
a support;
a first tag holder connected with the support and accommodating a first near field communication (NFC) tag; and
a second tag holder connected with the support and accommodating a second NFC tag,
wherein the first tag holder and the second tag holder are configured to rotate about an axis,
wherein the test apparatus is configured to move the first tag holder to adjust a first distance between the first NFC tag and a test board including an NFC chip based on a type of the first NFC tag, and
wherein the test apparatus is configured to move the second tag holder to adjust a second distance between the second NFC tag and the test board based on a type of the second NFC tag different from the type of the first NFC tag.

11. The test apparatus of claim 10,
wherein the first tag holder moves along a direction in which the support extends, so as to adjust the first distance, and
the second tag holder moves along the direction in which the support extends, so as to adjust the second distance.

12. The test apparatus of claim 10,
wherein the test apparatus is configured to cause the first tag holder to move to adjust the first distance, to rotate the first and second tag holders about the axis, and then to move the second tag holder to adjust the second distance.

13. The test apparatus of claim 10, further comprising:
a controller for adjusting the second distance by rotating the first and second tag holders after the first distance is adjusted and a first communication test between the first NFC tag and the NFC chip is performed.

14. The test apparatus of claim 13,
wherein, in the first communication test, the test board transmits a first signal including a read command to the first NFC tag, and
the first NFC tag having received the first signal transmits a second signal including first data stored in the first NFC tag to the NFC chip.

15. The test apparatus of claim 14,
wherein the first communication test includes:
a first sub communication test in which the NFC chip and the first NFC tag transmit and receive each of the first and second signals at a first rate; and
a second sub communication test in which the NFC chip and the first NFC tag transmit and receive each of the first and second signals at a second rate.

16. The test apparatus of claim 10, further comprising:
a rotator connected with the support and rotating the first and second tag holders about the axis; and
a distance controller connected with the support and moving each of the first and second tag holders to adjust each of the first and second distances.

17. The test apparatus of claim 16,
wherein the distance controller is configured to move along a direction in which the support extends,
wherein the rotator and the distance controller are connected with each other to rotate the distance controller by rotation of the rotator about the axis, and
wherein the first and second tag holders are connected with the distance controller.

18. The test apparatus of claim 16, further comprising:
a rail connected with the support,
wherein the distance controller moves on the rail along a direction in which the support extends.

19. The test apparatus of claim 18, further comprising:
a connector disposed at the distance controller,
wherein the connector engaged the distance controller, the first tag holder and the second tag holder with each other.

* * * * *